United States Patent
Hsieh et al.

(10) Patent No.: US 6,466,217 B1
(45) Date of Patent: Oct. 15, 2002

(54) METHOD AND APPARATUS FOR ENSURING BACKWARD COMPATIBILITY IN A BUCKET RENDERING SYSTEM

(75) Inventors: Hsien-cheng Emile Hsieh, Gold River; Vladimir M. Pentkovski, Folsom, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/470,924

(22) Filed: Dec. 22, 1999

(51) Int. Cl.[7] ................................. G06F 1/20
(52) U.S. Cl. .................. 345/503; 345/501; 345/502; 345/522
(58) Field of Search ................. 345/503, 501, 345/502, 522

(56) References Cited

U.S. PATENT DOCUMENTS

| | | | |
|---|---|---|---|
| 5,590,249 A | * 12/1996 | Hanaoka | ............ 395/122 |
| 5,640,543 A | * 6/1997 | Farrell et al. | ............ 395/502 |
| 5,852,443 A | * 12/1998 | Kenworthy | ............ 345/431 |
| 5,886,701 A | 3/1999 | Chauvin et al. | |
| 5,982,399 A | 11/1999 | Scully et al. | ............ 345/522 |
| 5,999,189 A | 12/1999 | Kajiya et al. | ............ 345/430 |
| 6,147,695 A | * 11/2000 | Bowen et al. | ............ 345/503 |
| 6,198,477 B1 | * 3/2001 | Kurtze et al. | ............ 345/302 |

FOREIGN PATENT DOCUMENTS

WO     WO 99/41704     8/1999     ............ G06T/15/00

OTHER PUBLICATIONS

Jay Torborg and James T. Kajiya, Talisman: Commodity Realtime 3D Graphics.
The PC, pp. 11, Microsoft Corporation.

* cited by examiner

Primary Examiner—Mark Zimmerman
Assistant Examiner—Mackly Monestime
(74) Attorney, Agent, or Firm—Blakley, Sokoloff, Taylor & Zafman LLP (57) ABSTRACT

A method and apparatus of rendering an image is disclosed.

In one embodiment, a graphic system has a switch detector, which detects a switch condition in the graphics system. The graphics system also has a rendering block, which renders a plurality of layers according to the detected switch condition.

26 Claims, 9 Drawing Sheets

METHOD AND APPARATUS FOR ENSURING BACKWARD COMPATIBILITY IN A BUCKET RENDERING SYSTEM

FIELD OF THE INVENTION

This invention relates to image processing technologies generally and particularly to rendering technologies in a graphics system.

BACKGROUND OF THE INVENTION

As computer technologies continue to advance rapidly, computer users demand improved image qualities, both in terms of image processing speed and image fidelity. However, the cost of producing truly interactive and realistic visual effects continues to remain prohibitively high. As a result, different image processing techniques and designs are being developed to attempt to accommodate both the user demand and the desirable low cost.

More specifically, some efforts have been focused on an improved rendering technique, which attempts to utilize smaller working memories than a traditional rendering technique. One such improved technique is bucket rendering. In a traditional rendering scheme, random access to frame buffer data and/or depth buffer for an entire screen is required. A frame buffer refers to a portion of memory reserved for holding the complete bit-mapped image sent to the screen, and a depth buffer (also referred to as Z buffer in some literatures) refers to a portion of memory reserved for holding the depth information of the bit-mapped image. In order to process the amount of information in such a bit-mapped image and still achieve some interactive visual effect, a graphics system employing the traditional rendering scheme often utilizes a simultaneously large and fast memory subsystem as its frame and depth buffers. Some examples of the fast memories are, but not limited to, Video Random Access Memory (VRAM) and Dynamical Random Access Memory (DRAM). More importantly, the data stored in such fast memory subsystem are considered to be externally visible, because graphics applications operating on the traditional graphics system can directly access to the data at will.

On the other hand, the bucket rendering method only requires random access to a single tile, or a portion of the entire screen. The required memory subsystem to store information from this single tile is most likely smaller, faster and less costly than the aforementioned memory subsystem of the traditional graphics system. Hence, instead of maintaining data in externally visible frame and/or depth buffers, one embodiment of a bucket rendering graphics system, which applies the described smaller memory subsystem above, maintains its data within the system.

Although such a bucket rendering graphics system may yield better performance at a lower cost than the traditional graphics system, the bucket rendering graphics system has limited support for some existing graphics applications and application programming interfaces (hereinafter APIs) that rely on the stored data which are externally visible. Throughout this disclosure, an "existing graphics application" refers to a graphics application designed to function and execute correctly on any graphics system in existence prior to the existence of the described bucket rendering graphics system. The following example further illustrates the incompatibility problem. In particular, an existing graphics application may issue a request to lock the frame buffer and/or the depth buffer through an API, which has been designed to presume direct access to the frame buffer and/or the depth buffer. Since the described bucket rendering graphics system does not support externally visible frame buffers, the lock request fails and most likely causes errors in subsequent operations of the application. As has been demonstrated, the potential incompatibility between the existing graphics applications and the described bucket rendering graphics system will exist, unless these existing graphics applications are redesigned to somehow eliminate such lock operations, or the API is modified to accommodate a new architecture.

Additionally, even though the bucket rendering technique often offers performance improvement over a traditional rendering scheme, the reverse is true in situations where a graphics application chooses to rely on accessing the externally visible buffers. One such situation arises when multiple requests of the lock operation occur within a frame.

As has been demonstrated, in order to continue supporting existing graphics applications and to further improve the described bucket rendering technique, a method and apparatus is needed.

SUMMARY OF THE INVENTION

A method and apparatus of rendering an image is disclosed.

In one embodiment, a graphics system has a switch detector, which detects a switch condition in the graphics system. The graphics system also has a rendering block, which renders a plurality of layers according to the detected switch condition.

BRIEF DESCRIPTION OF THE DRAWINGS

The present invention is illustrated by way of example and is not limited by the figures of the accompanying drawings, in which like references indicate similar elements, and in which.

DETAILED DESCRIPTION

A method and apparatus of generating a rendered image is described. In the following description, well-known elements and theories, such as image processing, graphics systems, pixel, frame buffer, depth buffer, rendering, geometric primitives, bounding box bucket sorting, exact bucket sorting, etc., have not been discussed in special details in order to avoid unnecessarily obscuring the present invention.

As has been previously mentioned in the Background section, a frame buffer refers to a portion of memory reserved for storing a complete bit-mapped image shown on a display device, and a depth buffer stores depth information for each pixel of that image. Additionally, terms "bucket rendering", "bucket rendering technique" and "bucket rendering scheme" are used interchangeably throughout the written description to refer to one type of rendering method. "Geometric primitives" and "primitives" are also used interchangeably to refer to simple geometric shapes, such as points, lines, polygons (triangles and quadrilaterals are some examples), etc. Finally, "synchronization events" refer to events initiated by a graphics application to instruct a rendering system to synchronize its data with current operating conditions of the graphics application.

Figure 1:
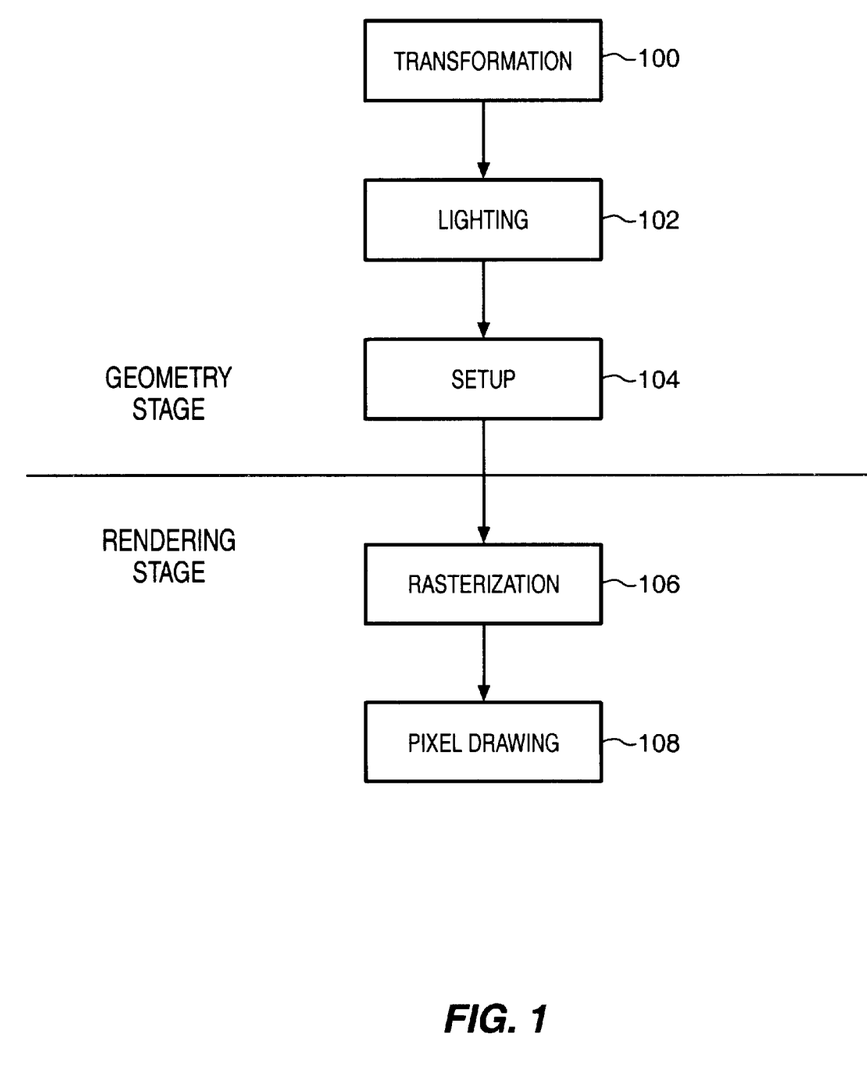
FIG. 1 illustrates typical operations of a graphics system.

A graphics system typically processes its input data in two main stages, geometry stage and rendering stage. The geometry stage is responsible for managing geometrical descriptions of objects to be displayed. The geometrical description can describe, but is not limited to, curved surfaces, polygons, lines, points or a mixture of all of the above. The geometry stage is also responsible for preparing appropriate rendering attributes for the rendering stage. The rendering stage, on the other hand, is responsible for managing memory and converting aforementioned geometrical description and its rendering attributes into pixels to be displayed on a display device of the graphics system. FIG. 1 illustrates some steps in each of the mentioned stages. For the geometry stage, the steps are transformation step 100, lighting step 102 and setup step 104.

More particularly, transformation step 100 changes the geometrical description of a multi-dimensional model or an object from its native coordinate system to a display coordinate system (sometimes also referred to as screen space) and synchronizes the transformed geometrical description in response to external inputs. For example, in a 3-dimensional (hereinafter 3-D) interactive game, a user's operating of an input device, such as a mouse, may cause certain objects in a scene to move or rotate. Transformation step 100 is responsible for, but not limited to, moving these objects in different directions, rotating them in relation to the user's view, or scaling them to change their sizes.

Since lighting affects the appearance of objects in a scene, lighting step 102 approximates the effects of various light sources interacting with these objects and determines the appropriate colors for these objects in order to convey a realistic appearance. Finally, setup step 104 computes the rendering attributes, such as diffuse color, specular color and texture coordinates, of the transformed geometrical description. Optionally, setup step 104 can convert the transformed geometrical description into a different format suitable for a rendering subsystem. For example, setup step 104 can convert a curved surface description into polygonal description before calculating its rendering attributes. Then setup step 104 prepares and hands off appropriate data to rasterization step 106.

Rasterization step 106 of the rendering stage then proceeds to put together information to be drawn to a 2-dimensional (hereinafter 2D) display. For example, rasterization step 106 computes the final color of pixels that are covered by the aforementioned transformed geometrical descriptions. Also, rasterization step 106 utilizes some texture mapping, alpha blending or anti-aliasing techniques to further enhance visual effects. The outputs of 106 are pixel values ready for pixel drawing step 108.

Figure 2A:
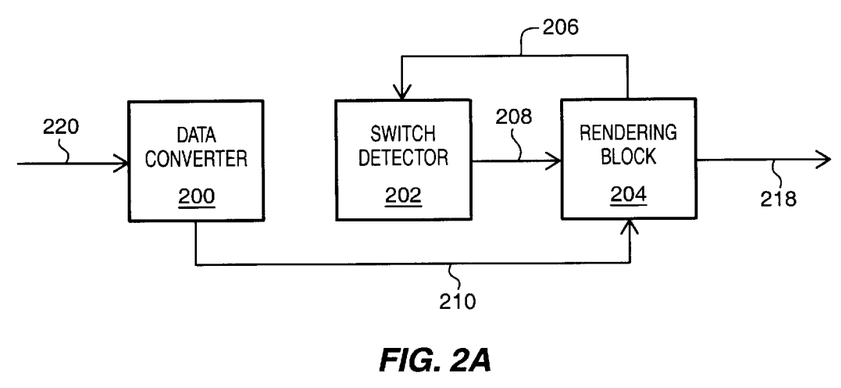
FIG. 2(a) illustrates a block diagram of one embodiment of a rendering system.
Figure 2B:
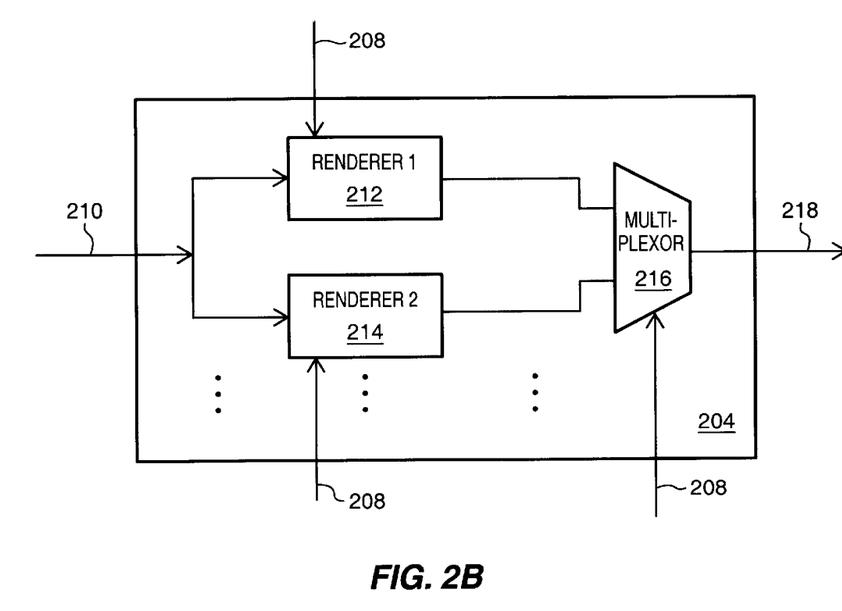
FIG. 2(b) illustrates a block diagram of one embodiment of a rendering block within a rendering system.
Figure 2C:
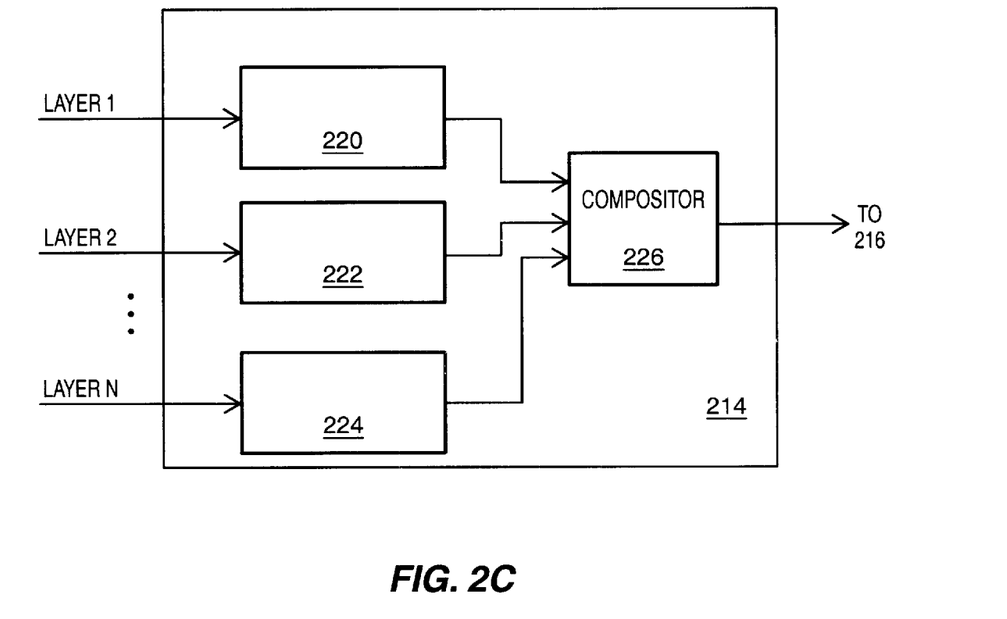
FIG. 2(c) illustrates a block diagram of one embodiment of a renderer within a rendering block.

FIGS. 2(*a*), 2(*b*) and 2(*c*) illustrate block diagrams of one embodiment of a rendering system, which addresses the issues of compatibility and performance previously discussed in the Background section. Data converter 200 performs operations previously described in the geometry stage on input data 220 and sends its converted output 210 to rendering block 204 for further processing. Rendering block 204, on the other hand, executes tasks in the rendering stage. According to rendering block 204's feedback 206, switch detector 202 generates a switch signal 208 containing a switch condition and sends it back to rendering block 204.

One embodiment of rendering block 204 comprises a plurality of renderers, such as renderer 1, 212 and renderer 2, 214. These renderers may utilize varying rendering techniques. Depending on the switch condition indicated in switch signal 208, rendering block 204 chooses either renderer 1, 212 or renderer 2, 214 to process converted output 210. Then multiplexor 216 produces its output pixels 218 for display based on switch signal 208 and renderers' output signals.

Figure 7:
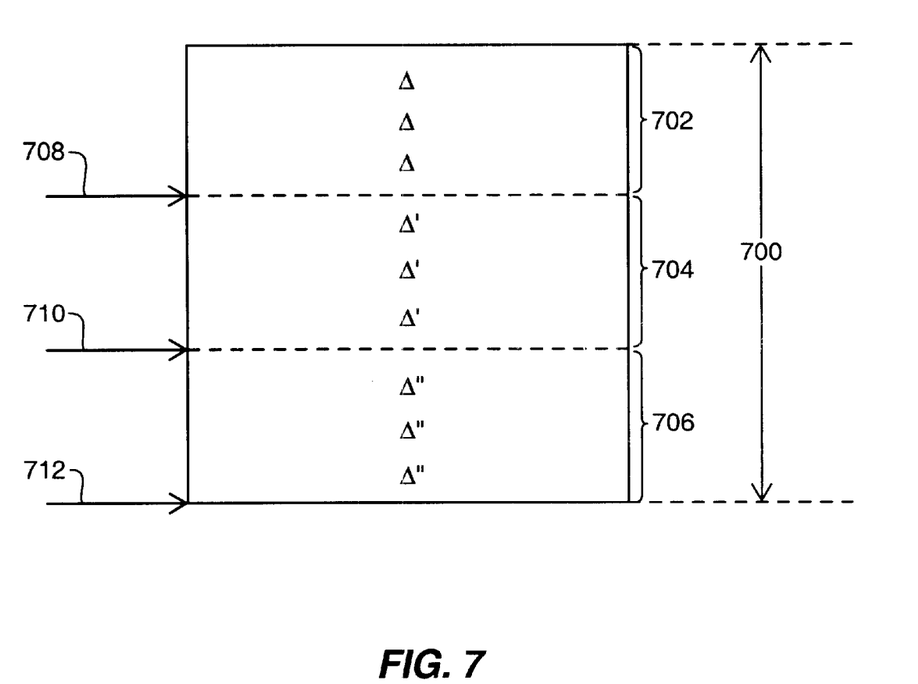
FIG. 7 illustrates the concept of layers within a scene.
Figure 8:
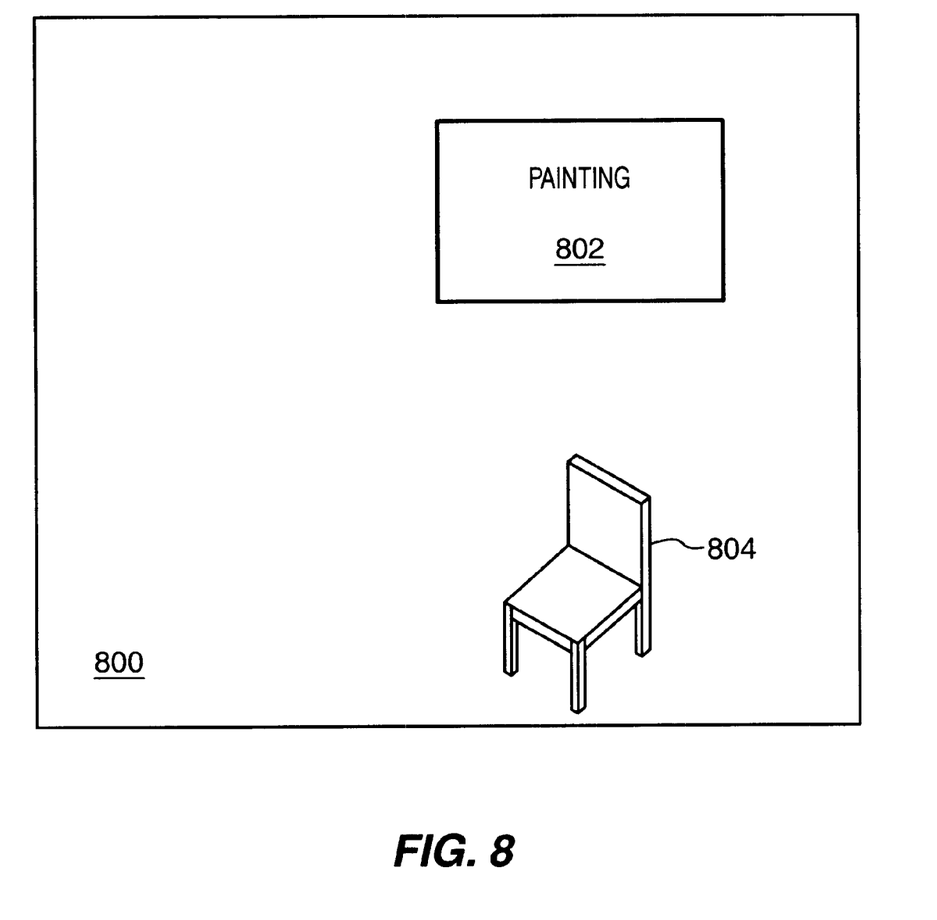
FIG. 8 illustrates an example scene consisting of multiple layers.

FIG. 2(*c*) demonstrates one embodiment of renderer 2, 214. Renderer 2, 214 is a scalable rendering system, capable of handling up to an integer number, n, of layers. The term "layer" refers to a segment of frame buffer and depth buffer data, where the segmentation of the data is a result of some requests from graphics applications. For example, FIG. 7 illustrates a frame of scene data 700 (with both frame buffer data and depth buffer data) representing the 3D graphics image shown in FIG. 8. In particular, scene data 700 contains relevant geometric primitives, texture state data, etc. to represent background wall 800, painting 802 hanging on background wall 800 and chair 804 in front of background wall 800.

A graphics application utilizing renderer 2, 214 may issue various requests to the renderer, such as a direct buffer access request and a flip request. Specifically, FIG. 7 illustrates two lock events, 708 and 710, in response to the mentioned direct buffer access requests and flip event 712, in response to the mentioned flip request. The flip request informs renderer 2, 214, to work on a different set of scene data but to display the resulting bit-mapped image of scene data 700 on a display device. In the example shown in FIG. 7, three "layers" exist. The first layer consists of the segment between the start of scene data 700 and lock event 708 (including lock event 708). The second layer consists of the segment between lock event 708 and lock event 710 (including lock event 710). The third layer consists of the segment between lock event 710 and flip event 712 (including flip event 712).

With the concept of layer in mind, renderer 2, 214 also comprises multiple sub-renderers 220, 222 and 224, where each sub-renderer processes a layer. Compositor 226 of renderer 2, 214 then combines the outputs of the sub-renderers and transmits the combined output to multiplexor 216.

Figure 3:
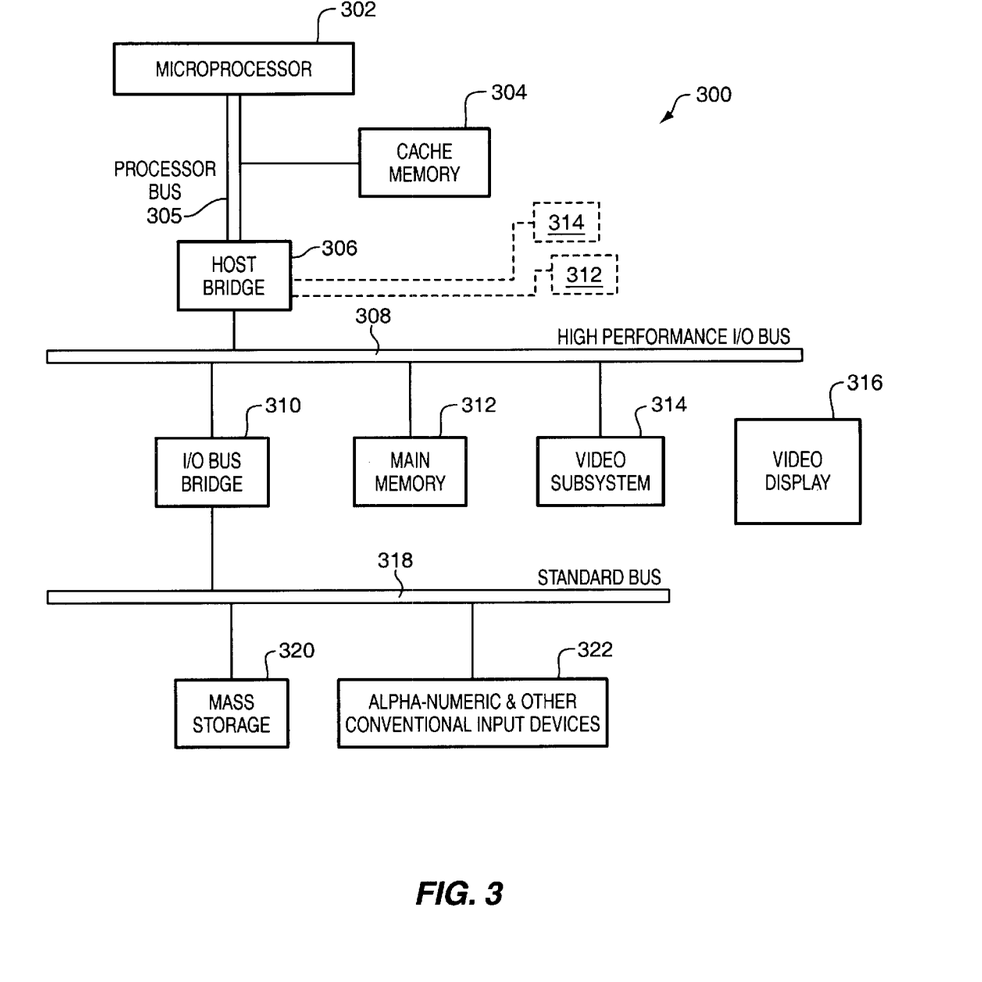
FIG. 3 illustrates a general-purpose computer system architecture.

The blocks shown in FIG. 2(a) can be programmed or implemented in an electronic system. Some examples of an electronic system are, but not limited to, add-in circuit boards, standalone electronic apparatuses and general-purpose computer systems. A general-purpose computer system 300 is illustrated in FIG. 3.

The general-purpose computer system architecture comprises microprocessor 302 and cache memory 304 coupled to each other through processor bus 305. Sample computer system 300 also includes high performance I/O bus 308 and standard I/O bus 318. Processor bus 305 and high performance I/O bus 308 are bridged by host bridge 306, whereas high performance I/O bus 308 standard I/O bus 318 are bridged by I/O bus bridge 310. Coupled to high performance 11O bus 308 are main memory 312 and video subsystem 314. Video subsystem 314 often comprises its own processing unit and memory unit. Coupled to video subsystem 314 is video display 216. Alternatively, as shown by dotted lines, video subsystem 314 or main memory 312 may also be coupled to host bridge 306. Coupled to standard I/O bus 318 are mass storage 320, network interface 324, and alphanumeric input device or other conventional input device 322.

These elements perform their conventional functions well known in the art. In particular, mass storage 320 may be used to provide permanent storage for the executable instructions in one embodiment, whereas main memory 312 may be used to temporarily store the executable instructions of an embodiment during execution by microprocessor 302.

Detailed Operation of a Rendering Block

A method and apparatus of generating a rendered image is described. Specifically, in one embodiment, the method and the apparatus select from a collection of renderers to perform rendering and maintain information stored in the frame buffer and depth buffer of the apparatus.

Figure 4:
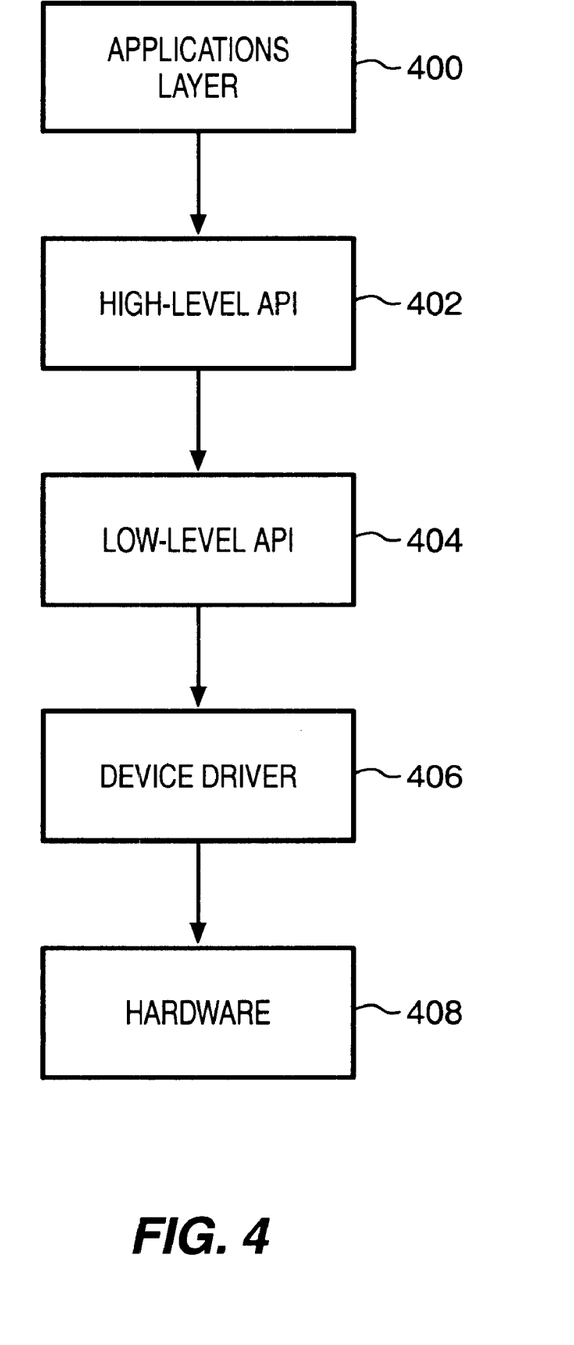
FIG. 4 illustrates an example of levels of abstractions in a graphics system.

The embodiment operates on an electronic system or in particular, general-purpose computer 300. FIG. 4 demonstrates levels of abstractions one embodiment operates on. Application layer 400 refers to graphics applications. One such example is 3D interactive games. Instructions of these graphics applications are typically stored in mass storage 320 and are executed by microprocessor 302. Within application layer 400, the graphics applications may invoke existing rendering software routines to handle their rendering tasks. These rendering software routines thus provide high level API 402 for application layer 400. One example of high level API 402 is Direct3D® retained mode from Microsoft Corporation.

High level API 402 however may call other low-level routines developed by the operating system of general-purpose computer 300, such as, but not limited to, Direct3D® immediate mode or OpenGL®. These routines are categorized as low level API 404, and they also interface with device driver 406. Device driver 406 is generally custom-designed for and directly communicates with hardware 408. Hardware 408 typically refers to video subsystem 314 shown in FIG. 3. It should have been obvious to one skilled in the art to implement the illustrated blocks in FIG. 2(a) in device driver 406, hardware 408 or a combination of the both.

As has been discussed previously, switch detector 202 generates switch signal 208 based on rendering block 204's feedback 206. In one embodiment, rendering block 204 may maintain information relating to the number of direct buffer access requests or synchronization events (hereinafter quirks) per frame. When the number exceeds a certain threshold, performance of certain rendering techniques, such as bucket rendering, may become less desirable than a traditional rendering scheme. When rendering block 204 indicates this finding in its feedback 206, switch detector 202 translates the information in feedback 206 into a switch condition and embeds the condition in its switch signal 208. It should have been apparent to one with ordinary skills in the art to design rendering block 204 to track other information other than the mentioned lock operations or to establish different threshold values for triggering the discussed switch condition.

Figure 5:
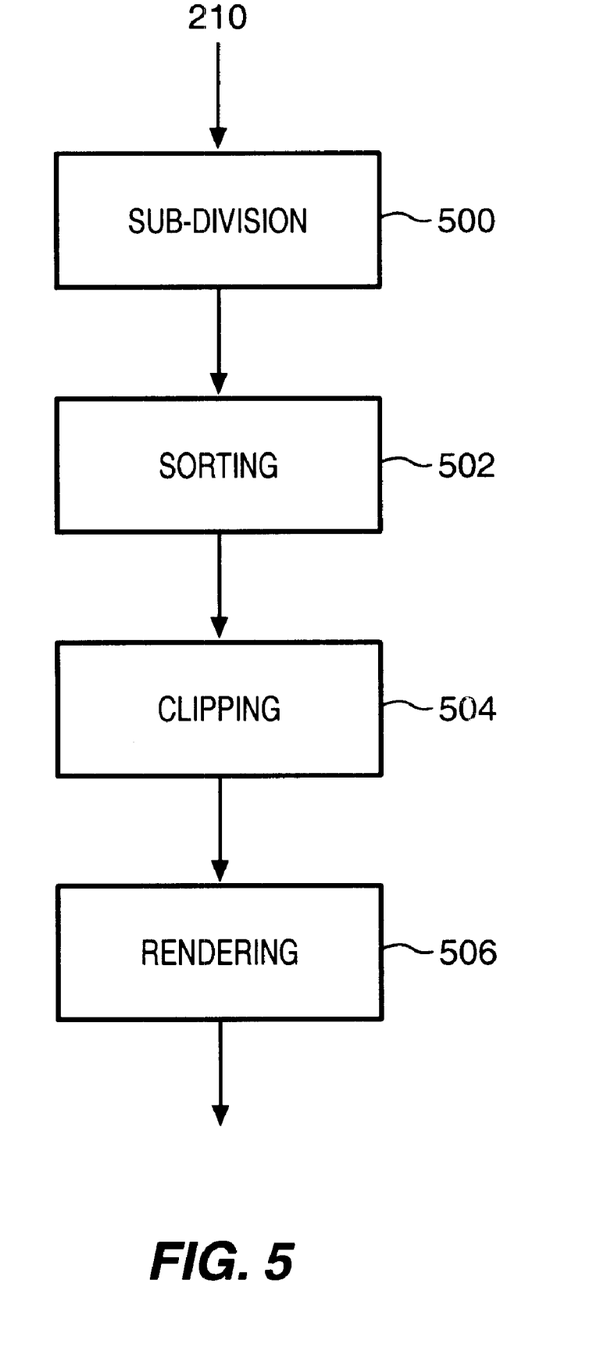
FIG. 5 illustrates the sequence of performing bucket rendering.
Figure 6:
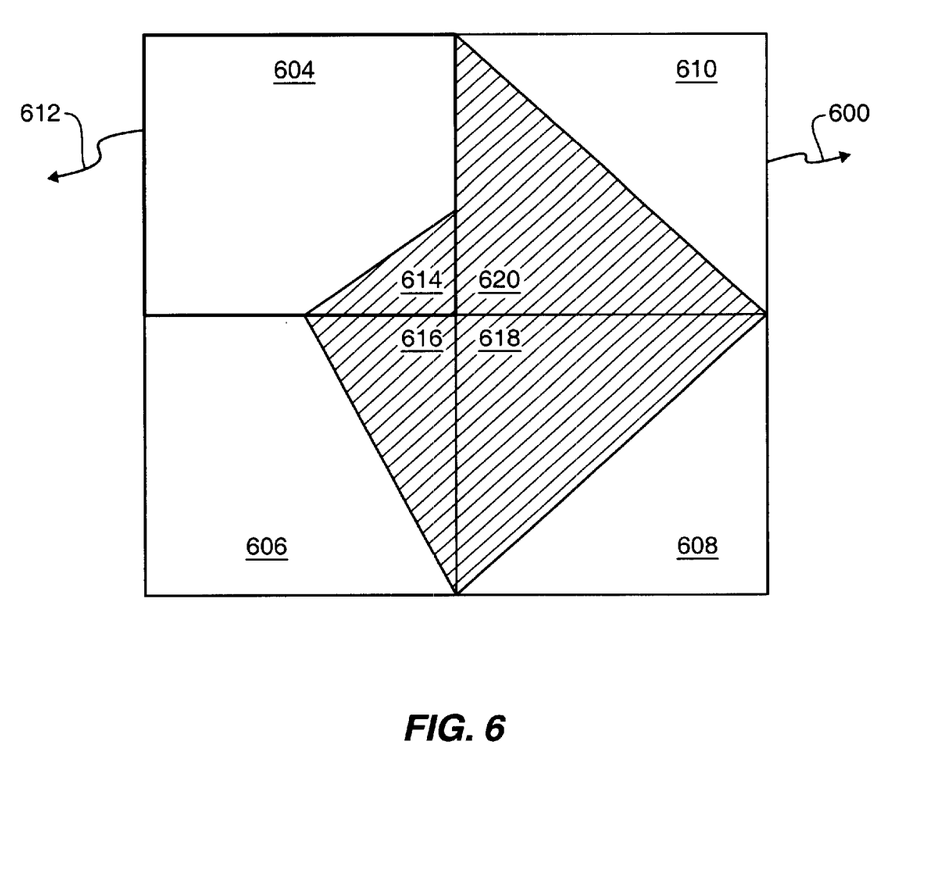
FIG. 6 illustrates an example of performing bucket rendering on a scene.

In addition to tracking performance information and generating feedback 206, rendering block 204 comprises a collection of renderers. In one embodiment, renderer 1, 212, uses a traditional rendering scheme, and sub-renderers 220, 222 and 224 in renderer 2, 214, employ the previously mentioned bucket rendering scheme. The flow chart illustrated in FIG. 5 in conjunction with an example scene shown in FIG. 6 describe operations of the bucket rendering method. FIG. 6 shows scene 600 with a simple object 602.

When switch signal 208 indicates switching to renderer 2, 214 and indicates that only one layer exists (i.e. the number of quirks equals to 0), renderer 2, 214 begins processing converted output 210 of scene 600 with one of its bucket rendering based sub-renderers. The process starts with sub-dividing scene 600 into regions 604, 606, 608 and 610 in block 500. In one embodiment, clipping rectangle 612 is the minimum rectangle capable of covering pixels of objects in scene 600, such as 602, in each of the subdivided regions. Therefore, in this instance, the size of clipping rectangle 612 coincides with the size of the subdivided regions.

After subdivision, since converted output 210 have already gone through the geometry stage, information on scene 600's primitives is available and is sorted into appropriate regions in 502. In particular, primitive 614 belongs to region 604, primitive 616 to region 606, primitive 618 to region 608 and primitive 620 to region 610. Various sorting algorithms may be applied in 502 without exceeding the scope of the described rendering block 204. Some applicable algorithms, but not limited to, are bounding box bucket sorting and exact bucket sorting. It is also important to note that any commands or instructions associated with state changes or operations of the primitives are also organized and placed into their corresponding regions.

Once primitives and relevant commands are in their corresponding regions, clipping rectangle 612 removes any information outside of the regions in 504. It should have been apparent to one ordinarily skilled in the art to either combine 504 with 502 or 504 with 506. Moreover, when clipping rectangle 612 finishes eliminating information outside of region 604, it can move on to a different region, such as region 606, by simply changing its coordinates. After sorting and clipping, primitives in each region are rendered in the sequence of their submission to their regions in 506.

When multiple layers exist, or in other words, the number of quirks is greater than zero, and when switch signal 208 indicates switching to renderer 2, 214, one embodiment of renderer 2, 214 then proceeds to assign each layer to one of its bucket rendering based sub-renderers (220, 222 and 224). Using FIG. 8 as an illustration, layer 1 may correspond to background wall 800 and is assigned to sub-renderer 220. Layer 2 may correspond to painting 802 and is assigned to sub-renderer 222. Layer 3 may correspond to chair 804 and is assigned to sub-renderer 224. The operations performed by these sub-renderers are essentially the same as the ones previously described in conjunction with FIG. 5 and FIG. 6. Compsitor 226 then collects rendered data for layer 1, layer 2 and layer 3 and determines relative depth information among background wall 800, painting 802 and chair 804. Based on that determination, compositor 226 proceeds to organize different layers' rendered data and generate appropriate pixel data for display.

Alternatively, another embodiment of renderer 2, 214 may consist of one sub-renderer, such as sub-renderer 220, but still manage to process multiple layers. First, renderer 2, 214 ensures that complete and externally visible frame buffer and/or depth buffer exist. Second, sub-renderer 220 begins rendering scene data in layer one (up to the point of lock event 708). Upon detecting lock event 708, sub-renderer 220 flushes frame and/or depth buffer data to externally visible buffers. The data are maintained because for compatibility with existing graphics applications or for rendering of subsequent layers. Third, sub-renderer 220 proceeds to render layer two up to lock event 710. Similarly, sub-renderer 212 flushes frame and/or depth buffer data to externally visible buffers upon encountering lock event 710. Lastly, sub-renderer 220 renders layer three up until flip event 712 and again flushes frame and/or depth buffer data to externally visible buffers. It should be noted that composition of the layers to produce an output for multiplexor 216 is implicitly accomplished through the three aforementioned flushes.

Thus, a method and apparatus for generating a rendered image has been disclosed. Although the method and apparatus have been described particularly with reference to the figures, they may appear in any number of systems, which provide the capability of generating a rendered image. It is further contemplated that many changes and modifications may be made by one of ordinary skill in the art without departing from the spirit and scope of the discussed method and apparatus.

What is claimed is:

1. A graphics system for generating a rendered image, comprising:
   a switch detector to detect a switch condition in the graphics system; and
   a rendering block, coupled to the switch detector, to render a plurality of layers according to the detected switch condition, the rendering block comprising:
   a multiplexer;
   a first renderer, coupled to the multiplexer, to utilize a traditional rendering technique; and
   a second renderer, coupled to the multiplexer, to utilize a bucket rendering technique.

2. The graphics system according to claim 1, wherein the switch condition is based on a number of quirks per frame.

3. The graphics system according to claim 1, wherein the second renderer further comprises:
   a plurality of sub-renderers to process the plurality of layers; and
   a compositor, coupled to the sub-renderers, to combine rendered outputs of the sub-renderers.

4. The graphics system according to claim 3, wherein the sub-renderers further utilize the bucket rendering technique.

5. The graphics system according to claim 4, wherein the sub-renderers further:
   subdivides the layers into a plurality of regions;
   renders independently the regions; and
   maintains frame buffer data of the layers in an externally visible buffer.

6. The graphics system according to claim 5, wherein subdividing the layers into a plurality of regions further comprises sorting and placing primitives of the layers into the divided regions.

7. The graphics system according to claim 5, wherein maintaining frame buffer data of the layers in an externally visible buffer further maintains depth buffer data of the layers in the externally visible buffer.

8. An electronic system for generating a rendered image, comprising:
   a host bridge;
   a microprocessor coupled to the host bridge;
   a video subsystem, coupled to the host bridge, wherein the video subsystem further comprises:
   a switch detector to detect a switch condition in the graphics system; and
   a rendering block, coupled to the switch detector, to render a plurality of layers according to the detected switch condition, the rendering block comprising:
   a multiplexer;
   a first renderer, coupled to the multiplexer, to utilize a traditional rendering technique; and
   a second renderer, coupled to the multiplexer, to utilize a bucket rendering technique.

9. The electronic system according to claim 8, wherein the switch condition is based on a number of quirks per frame.

10. The electronic system according to claim 8, wherein the second renderer further comprises:
    a plurality of sub-renderers to process the plurality of layers; and
    a compositor, coupled to the sub-renderers, to combine rendered outputs of the sub-renderers.

11. The electronic system according to claim 10, wherein the sub-renderers further utilize the bucket rendering technique.

12. The electronic system according to claim 11, wherein the sub-renderers further:
    subdivide the layers into a plurality of regions;
    render independently the regions; and
    maintain frame buffer data of the layers in an externally visible buffer.

13. The electronic system according to claim 12, wherein subdividing the layers into a plurality of regions further comprises sorting and placing primitives of the layers into the divided regions.

14. The electronic system according to claim 12, wherein maintaining frame buffer data of the layers in an externally visible buffer further maintains depth buffer data of the layers in the externally visible buffer.

15. A method for generating a rendered image, comprising:
   detecting a switch condition in the graphics system;
   rendering a plurality of layers according to the detected switch condition; and
   selecting between a traditional rendering technique and a bucket rendering technique according to the detected switch condition.

16. The method according to claim 15, wherein the switch condition is based on a number of quirks per frame.

17. The method according to claim 15, wherein rendering with the bucket rendering technique further comprises:
   rendering the plurality of layers; and
   combining rendered outputs of the layers.

18. The method according to claim 17, wherein rendering the layers further comprises:
   subdividing the layers into a plurality of regions;
   rendering independently the regions; and
   maintaining frame buffer data of the layers in an externally visible buffer.

19. The method according to claim 18, wherein subdividing the layers into a plurality of regions further comprises sorting and placing primitives of the layers into the divided regions.

20. The method according to claim 18, wherein maintaining frame buffer data of the layers in an externally visible buffer further comprises maintaining depth buffer data of the layers in the externally visible buffer.

21. A machine readable medium having embodied thereon instructions, which when executed by a graphics system, causes the graphics system to generate a rendered image by:
   detecting a switch condition in the graphics system;
   rendering a plurality of layers according to the detected switch condition; and
   selecting between a traditional rendering technique and a bucket rendering technique according to the detected switch condition.

22. The machine readable medium according to claim 21, wherein the switch condition is based on a number of quirks per frame.

23. The machine readable medium according to claim 21, wherein rendering with the bucket rendering technique further comprises:
   rendering the plurality of layers; and
   combining rendered outputs of the layers.

24. The machine readable medium according to claim 23, wherein rendering the layers further comprises:
   subdividing the layers into a plurality of regions;
   rendering independently the regions; and
   maintaining frame buffer data of the layers in an externally visible buffer.

25. The machine readable medium according to claim 24, wherein subdividing the layers into a plurality of regions further comprises sorting and placing primitives of the layers into the divided regions.

26. The machine readable medium according to claim 24, wherein maintaining frame buffer data of the layers in an externally visible buffer further comprises maintaining depth buffer data of the layers in the externally visible buffer.

* * * * *

UNITED STATES PATENT AND TRADEMARK OFFICE
CERTIFICATE OF CORRECTION

PATENT NO.      : 6,466,217 B1
DATED           : October 15, 2002
INVENTOR(S)     : Aksamit

It is certified that error appears in the above-identified patent and that said Letters Patent is hereby corrected as shown below:

<u>Title page,</u>
Item [57], ABSTRACT,
Line 3, delete "graphic", insert -- graphics --.

<u>Column 5,</u>
Line 25, delete "llO", insert -- I/O --.

Signed and Sealed this

First Day of April, 2003

JAMES E. ROGAN
*Director of the United States Patent and Trademark Office*